US008972894B2

(12) United States Patent
Ross et al.

(10) Patent No.: US 8,972,894 B2
(45) Date of Patent: *Mar. 3, 2015

(54) TARGETING QUESTIONS TO USERS OF A SOCIAL NETWORKING SYSTEM

(71) Applicant: Facebook, Inc., Menlo Park, CA (US)

(72) Inventors: Blake Ross, Palo Alto, CA (US); Venkataramanan Iyer Nandagopal, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/304,918

(22) Filed: Jun. 14, 2014

(65) Prior Publication Data

US 2014/0297754 A1 Oct. 2, 2014

Related U.S. Application Data

(63) Continuation of application No. 12/978,205, filed on Dec. 23, 2010, now Pat. No. 8,812,982.

(51) Int. Cl.
*G06F 3/0482* (2013.01)
*H04L 29/08* (2006.01)
*G06Q 10/10* (2012.01)
*G06Q 30/02* (2012.01)

(52) U.S. Cl.
CPC ............. *H04L 67/306* (2013.01); *G06Q 10/10* (2013.01); *G06Q 30/02* (2013.01)
USPC .......................................... 715/811; 715/733

(58) Field of Classification Search
CPC combination set(s) only.
See application file for complete search history.

(56) References Cited

U.S. PATENT DOCUMENTS

| | | | | |
|---|---|---|---|---|
| 5,369,763 | A * | 11/1994 | Biles | 1/1 |
| 6,029,195 | A * | 2/2000 | Herz | 725/116 |
| 6,442,590 | B1 * | 8/2002 | Inala et al. | 709/204 |
| 6,578,025 | B1 * | 6/2003 | Pollack et al. | 1/1 |
| 6,792,448 | B1 * | 9/2004 | Smith | 709/204 |
| 7,043,497 | B1 * | 5/2006 | Carty et al. | 1/1 |
| 8,103,947 | B2 * | 1/2012 | Lunt et al. | 715/200 |
| 2002/0016797 | A1 * | 2/2002 | Taysi | 707/508 |
| 2003/0227479 | A1 * | 12/2003 | Mizrahi et al. | 345/753 |
| 2008/0307320 | A1 * | 12/2008 | Payne et al. | 715/751 |
| 2010/0070554 | A1 * | 3/2010 | Richardson et al. | 709/202 |
| 2010/0217645 | A1 * | 8/2010 | Jin et al. | 705/9 |
| 2012/0173992 | A1 * | 7/2012 | D'Angelo et al. | 715/751 |

* cited by examiner

*Primary Examiner* — Phenuel Salomon
(74) *Attorney, Agent, or Firm* — Fenwick & West LLP (57) ABSTRACT

Users of a social networking system post questions for other users to answer. Questions are automatically tagged based on keywords extracted from text within the posted questions as well as user-selected tags. Users also browse questions asked by other users on the social networking system using an interface that displays questions by topics and sub-topics. Answers may be voted on and sorted by social information related to the browsing user. Affinities for tags are recorded based on users' interactions with the question and answer service. Affinities for tags may also be used to target questions to other users and sort answers.

14 Claims, 4 Drawing Sheets

TARGETING QUESTIONS TO USERS OF A SOCIAL NETWORKING SYSTEM

CROSS-REFERENCE TO RELATED APPLICATION

This application is a continuation of U.S. patent application Ser. No. 12/978,205, filed on Dec. 23, 2010, entitled, "Targeting Questions to Users of a Social Networking System," now U.S. Pat. No. 8,812,982 issued Aug. 19, 2011, which is incorporated by reference herein in their entirety.

BACKGROUND

This invention relates generally to social networking and, in particular, to a system for enabling users of a social networking system to answer questions asked by other users of the social networking system.

Traditional question and answer software systems rely on documents that answer questions posed by users. A question entered by a user is searched using natural language processing systems to retrieve documents that answer the question. Often, the documents that are presented to the user do not specifically answer the question entered, and instead simply offer an encyclopedic explanation of the general topic of the question.

User-generated content question and answer systems have emerged in recent years to address this problem. A user posts a question to a forum, and another user answers the question. The answering user may or may not be an expert in the topic of the question. In fact, the answering user could simply be browsing questions in the forum, completely unrelated to the user asking the question. The questioning user has no way to judge the expertise of the answering user. The user posing the question classifies the question under as specific topic and waits for other users to answer the question. Because a user may not "tag" or classify the question under other related topics, the question may remain unanswered, or answers may be incorrect or incomplete. To maintain quality control, these systems rely on human moderators to monitor newly created questions and manually modify the topic of an incorrectly or incompletely tagged question with the correct tag(s).

Social networking systems enable users to communicate and interact with other users on an ongoing basis. Question and answer systems have not enabled users to interact with relevant questions and answers from other users they are connected to. As the number of users of a social networking system grows, the number of questions asked may overwhelm users and moderators of the question and answer system. Finding relevant questions to answer becomes more challenging as the number of questions and answers grow exponentially. Additionally, duplicative questions and answers may discourage users from using the question and answer service. Tools are needed to address these problems.

SUMMARY

Users of a social networking system post questions for other users to answer. Questions are automatically tagged based on keywords extracted from text within the posted questions as well as user-selected tags. Users browse questions asked by other users on the social networking system using an interface that displays questions by topics and sub-topics. Answers may be voted on and sorted by social information related to the browsing user. Affinities for tags are recorded based on users' interactions with the question and answer service. Affinities for tags may also be used to target questions to other users and sort answers.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, a user can provide age, gender, geographical location, education history, employment history and the like describing them. The information provided by users may be used by the social networking system to direct information to the user. For example, the social networking system may recommend social groups, events, and potential friends to a user.

A social networking system may also use profile information describing a user to direct questions to the user, ensuring that only relevant questions are directed to the user. Question and answer systems have emerged on the Internet in recent years. A social networking system may provide more relevant questions to users based on their profile information than a traditional question and answer system. Targeting questions to users based on their interests results in answers that are more complete, more accurate, and more responsive than if presented to randomly selected users.

Providing a question and answer service on a social networking system takes advantage of the numerous actions that can be performed within a social network, allowing users to find useful and complete answers to questions without disrupting the social networking experience. Instead of posting a question to an Internet forum and waiting, perhaps indefinitely, for an answer, a question and answer service on a social networking system may target questions to users with related interests. This type of question and answer service is more effective than traditional question and answer systems because users are more likely to respond to a question related to their interests as well as questions asked by one of their connections.

A question and answer service on a social networking system can be integrated into the social networking experience to take advantage of other social actions. For example, a social networking system may display news stories to a user that are prioritized by the affinity for the user's connections and interests. A news story from a close connection may be displayed higher than another story from a user that has a lower affinity score. A targeted question mimics this functionality by enabling a user to view answers to the question asked that are prioritized by the connection to the user. Instead of merely displaying all responses to the question chronologically, like traditional question and answer services, answers from close friends are displayed higher than other answers. Additionally, other responses from users unconnected to the questioning user would be viewable. In this way, users receive a more personalized experience from a question and answer service on a social networking system.

Figure 1:
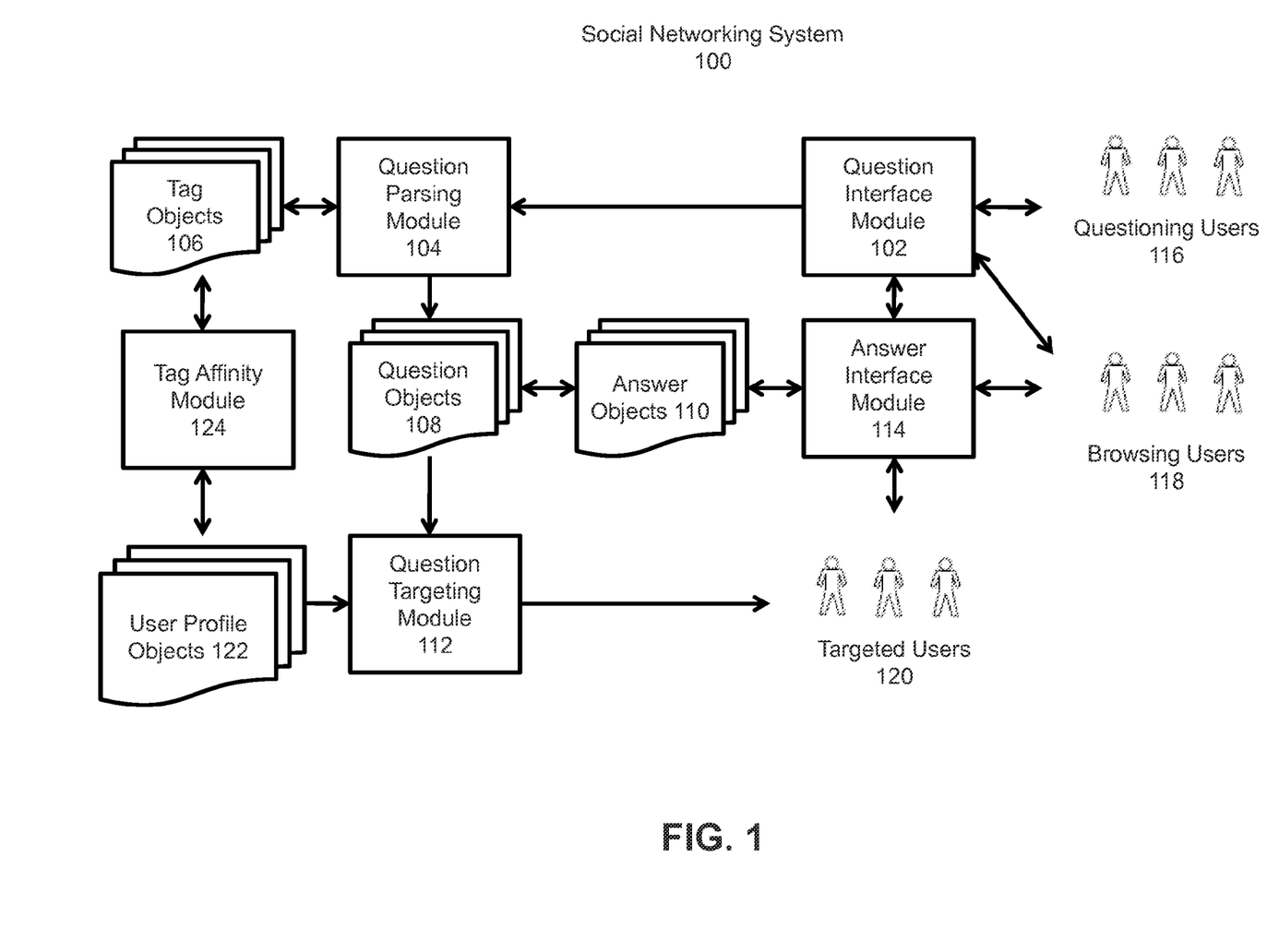
FIG. 1 is a high-level block diagram illustrating the creation of question objects by a user and tagging question objects for other users to create responsive answer objects, in accordance with an embodiment of the invention.

FIG. 1 is a diagram of the creation of question objects by a user and the targeting of the created question objects for other users to create responsive answer objects, in accordance with an embodiment of the invention. The social networking system 100 engages questioning users 116, browsing users 118, and targeted users 120 with a question and answer service. All users of the social networking system 100 may be questioning users 116, browsing users 118, and targeted users 120. The different types of users are delineated to illustrate the examples described below.

The social networking system 100 stores various objects comprising information related to users, connections between users, or other entities represented in the social networking system 100. These objects include question objects 108 that are created by questioning users 116 via a question interface module 102, tag objects 106 that have been created to describe the types of questions on the social networking system 100, user profile objects 122 that store information describing the users of the social networking system 100, and answer objects 110 that are created in response to a specific question on the social networking system 100 by browsing users 118 and targeted users 120. Users of the social networking system 100 may create multiple answer objects 110 that are associated with one or more question objects 108. Users may also vote up the answer objects 110 that are more responsive to the question being asked than other answers or vote down answer objects 110 that are not responsive, incomplete, or incorrect.

A question parsing module 104 receives questions asked by questioning users 116 that include text. The question parsing module 104 parses a question into keywords and accesses tag objects 106 to find tag objects 106 that are related to the keywords. For example, a user may ask "Where can I find good BBQ in SF?" The question parsing module 104 would parse the question and discover that the keyword "BBQ" is related to the "restaurant" and "BBQ" tags. Additionally, the keyword "SF" indicates that the question is related to the tag "San Francisco." Tag objects 106 are associated with searchable keywords. A tag object 106 would be associated with the question object 108 by the question parsing module 104. Machine learning techniques can be applied by the question parsing module 104 to discover relevant tags that should be associated with the keywords in the parsed questions using test data and live data.

A tag affinity module 124 records the affinity a questioning user 116 has for tag objects 106 in the user's user profile object 122. For example, a questioning user 116 may ask a lot of questions about restaurants in San Francisco. As a result, the tag affinity module 124 assigns a high affinity score for the "restaurant" and "San Francisco" tag objects 106 for user profile object 122 for the questioning user 116. The tag affinity module 124 also establishes a hierarchy of tags for related topics. For example, the "restaurant" tag is associated with the "BBQ," "burrito," "pizza," and "tapas" tags because the food items are generally served in restaurants. If a user has a high affinity for the "BBQ" tag, it may also be assumed that the user has a high affinity for the "restaurant" tag. In one embodiment, this relationship is managed using a graph of tag nodes (or "tag graph"), where related tags are connected by edges and the edges capture something about the degree of relatedness between the tags. When a question is assigned a tag T by a user or based on a keyword, the other tags connected to T are also probabilistically associated with the question depending on how "near" they are to T. Similarly, user-tag affinities may also propagate out on the tag graph. By establishing this taxonomy of topics, other modules may use the information recorded in a user's user profile object 122 to target the user with relevant questions based on the tag affinities.

A question targeting module 112 receives information from user profile objects 122 to determine which users may be interested in answering the questions posed by the question objects 108. These targeted users 120 may receive an indication that the targeted users 120 may be able to answer a question asked by a questioning user 116. The indication may be implemented as any communication with users on the social networking system 100, including email messages, wall posts, pop-up notifications, text messages, and instant messages. The question targeting module 112 also uses the information about the tag objects 106 associated with question objects 108 by the question parsing module 104 as recorded by the tag affinity module 124 in user profile objects 122. As a result, a user who has strong affinities for the tags "restaurant" and "San Francisco," as in the example above, may be targeted by the question targeting module 112 to answer a question associated with those tags.

The social networking system 100 includes an answer interface module 114 that enables browsing users 118 and targeted users 120 to view questions that have been posted by questioning users 116. Using the answer interface module 114, browsing users 118 and targeted users 120 may respond to the question using text, HTML, video, audio, and any other communication delivery mechanisms. A user's response is saved as an answer object 110 in the social networking system 100. The answer interface module 114 also provides browsing users 118 and targeted users 120 with the answer objects 110 that have been associated with a question object 108. Browsing users 118 and targeted users 120 may decide to vote up or down answer objects 110 that have already been associated with a question object 108 rather than provide their own answers.

The answer interface module 114 and the question interface module 102 are personalized to display relevant questions and answers to browsing users 118 and targeted users 120. For example, the display order of the answers can, in one embodiment, be sorted by similarity of the user who answered the question (i.e., the answering user) as compared with the user viewing the question. This sorting method assumes that the answers of users that enjoy similar interests or that are in similar demographics as the browsing user 118 or targeted user 120 are more likely to be relevant and characteristic of the browsing user 118 or targeted user 120.

Additionally, questions can be prioritized for display to browsing users 118 and targeted users 120 using information about the users' affinity for tags as recorded in their respective user profile objects 122. For example, a user that has viewed multiple questions about restaurants may be assigned a higher affinity for the "restaurant" tag and, therefore, be shown more questions about restaurants. Using social information about users on the social networking system 100, the answer interface module 114 and question interface module 102 may also prioritize questions and answers that have been acted upon by the user's connections on the social networking system 100. Further, questions can be displayed and sorted by a combination of the user's tag affinities and the user's connections' tag affinities.

Returning to the previous example, a browsing user 118 may view an answer that was very detailed and responsive to the question, "Where can I find good BBQ in SF?," and, rather than adding her own redundant answer, she may merely vote up the detailed answer and post the question and detailed answer to her profile to share with her friends. Additionally, she may vote down other answers that are not as responsive or that are incorrect. These actions, voting up and down various answers and sharing the question with her connections on the social networking system 100, indicate that she has a high affinity for the question, including the topics, or tags, within the question. When her strong connections click on the same question, the answer that she voted up will be displayed first, even if that answer has not received the most votes from other users of the social networking system that have viewed the question. In contrast, if weaker connections click the same question, the fact that she voted up the answer and shared the question may or may not affect the order of display. In one embodiment, a regression model may be used to determine the optimal balance of social information, including the actions of a user's connections, and other user's feedback on the answers to a question. The use of social information to sort the answers to a question may also be referred to herein as "social filtering."

In addition to using social information, the question interface module 102 and the answer interface module 114 also record the number of questions viewed by a user, the frequency of answering questions, recent history of viewing and interacting with questions and answers, the duration of browsing through questions, and the time spent in each topic and sub-topic browsing and answering questions. This information is stored in the user profile object 122 for the user and can be later accessed by the question targeting module 112 to determine whether a question should be targeted to the user and by the tag affinity module 124 to determine affinities for tags.

The question interface module 102 and the answer interface module 114 also receive information from user profile objects 122 about the trustworthiness of users providing questions and answers. Other modules on the social networking system 100 analyze user behavior on the social networking system 100 and record a trustworthiness score for their user profile objects 122. The question interface module 102 and the answer interface module 114 may use this information about a user's trustworthiness to determine whether a question or an answer should be shown to any user on the social networking system 100.

The question interface module 102 and the answer interface module 114 may be graphically rendered on the social networking system 100 in various locations to encourage users to use the question and answer service. In one embodiment, the question interface module 102 may appear on a web page served by the social networking system 100. A user may also add the question interface module 102 as a tab on a web page served by the social networking system 100 in another embodiment. Further, the question interface module 102 and the answer interface module 114 may be implemented as a text messaging service for mobile devices connected to the social networking system 100 in yet another embodiment.

Additionally, the question interface module 102 and the answer interface 114 may include functionality to enable users to "tag" the users' connections in a question object 108 or answer object 110. For example, a questioning user 116 may ask "Where is the best BBQ in SF?" and tag several of his friends that live in SF. In this way, the questioning user 116 is explicitly targeting the question to his friends, other users that he is connected to on the social networking system 100. The question targeting module 112 would receive these identified users' user profile objects 122 and incorporate them into other targeted users 120, in one embodiment. In another embodiment, the tagged users may be the only users targeted by the question because the questioning user 116 may have only wanted to ask a limited number of his connections on the social networking system 100. Similarly, a browsing user 118 or a targeted user 120 may decide to answer a question and tag a few of his connections on the social networking system 100 to get their input on the same question. In this case, the tagging of other users in the answer interface module 114 merely sends an indication to the tagged users that they have been tagged in an answer. The indication may be implemented as any communication with users on the social networking system 100, including email messages, wall posts, pop-up notifications, text messages, and instant messages. As a result, a specific answer object 110 may easily be virally distributed throughout the social networking system 100.

Various types of questions may be posed, viewed, and answered by users of the social networking system using the question interface module 102. Polling questions may be asked by questioning users to see various percentages of responding users, such as the questions "Should Don't Ask and Don't Tell legislation be repealed?" and "Which is better, San Francisco or Los Angeles?" These polling questions may be broken down by responses by a viewing user's connections as well as all users that have responded to the poll. Questions may also include video, audio, and image files as the main content of the question. For example, a questioning user 116 may submit a question that includes an image of a bird and the text "What kind of bird is this?" Another example may include a user who wants feedback on a musical performance and uploads a video or audio file and asks the polling question, "Should I perform this song on my senior recital?"

The questions interface module 102 also includes functionality besides providing questions to users to be answered. Questions can also be "followed" by users so that new responses can be automatically pushed to the users' newsfeed on the social networking system 100. Additionally, an entity or moderator of a node, such as the page for "Britney Spears," may answer a question on behalf of the entity. Thus, a question such as "Will Britney Spears make a stop in Dallas on her next tour, and when will that be?" can be followed by interested users and answered by the moderator of her page. Because "Britney Spears" and "Dallas" can be extracted as tags, users that have high affinities for both may be targeted to answer the question, but may decide to follow the question because they may not know the answer. The moderator for the page "Britney Spears" may be notified that a new question with the tag "Britney Spears" has been submitted by a trustworthy user. The moderator may decide to answer the question on behalf of the page. As a result, users of the social networking system 100 have a greater ability to interact and communicate with their favorite celebrities.

As illustrated by previous examples, questioning users 116 may create question objects 108 using a question interface module 102 that can be associated with tag objects 106 within a social networking system 100. Questions may be targeted to users 120 based on the tag affinities for tag objects 106 as recorded in their user profile objects 122. Browsing users 118, as well as targeted users 120, may interact with the answer interface module 114 to respond to a question. The user profile objects 122 record this information and may be used by the social networking system 100 to identify experts in certain topics, such as "restaurants" and "San Francisco." As a result, a social networking system 100 may better understand which topics interest their users based on the types of questions asked and answered.

System Architecture

Figure 2:
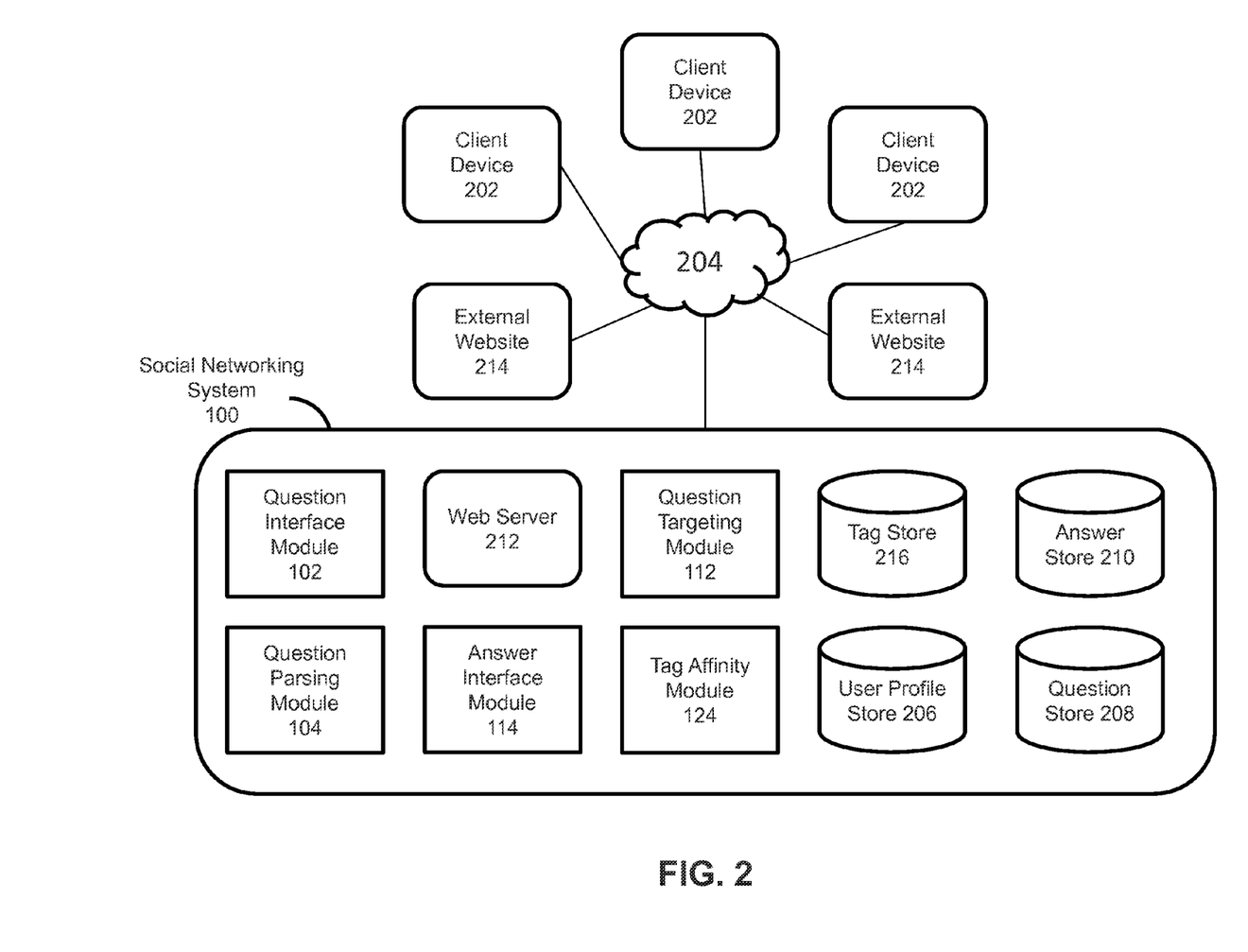
FIG. 2 is a network diagram of a system for questioning users of a social networking system, showing a block diagram of the social networking system, in accordance with an embodiment of the invention.

FIG. 2 is a high level block diagram illustrating a system environment suitable for tagging and targeting questions asked by users on a social networking system, in accordance with an embodiment of the invention. The system environment comprises one or more client devices 202, the social networking system 100, and a network 204. In alternative configurations, different and/or additional modules can be included in the system.

The client devices 202 comprise one or more computing devices that can receive user input and can transmit and receive data via the network 204. In one embodiment, the client device 202 is a conventional computer system executing, for example, a Microsoft Windows-compatible operating system (OS), Apple OS X, and/or a Linux distribution. In another embodiment, the client device 202 can be a device having computer functionality, such as a personal digital assistant (PDA), mobile telephone, smart-phone, etc. The client device 202 is configured to communicate via network 204. The client device 202 can execute an application, for example, a browser application that allows a user of the client device 202 to interact with the social networking system 100. In another embodiment, the client device 202 interacts with the social networking system 100 through an application programming interface (API) that runs on the native operating system of the client device 202, such as iOS 4 and DROID.

In one embodiment, the network 204 uses standard communications technologies and/or protocols. Thus, the network 204 can include links using technologies such as Ethernet, 802.11, worldwide interoperability for microwave access (WiMAX), 3G, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a question interface module 102, a question parsing module 104, an answer interface module 114, a web server 212, a question targeting module 112, a tag affinity module 124, a tag store 216, an answer store 210, a user profile store 206, and a question store 208. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 212 links the social networking system 100 via the network 204 to one or more client devices 202 and external websites 214; the web server 212 serves web pages, as well as other web-related content, such as Java, Flash, XML, and so forth. The web server 212 may provide the functionality of receiving and routing messages between the social networking system 100 and the client devices 202, for example, instant messages, queued messages (e.g., email), text and SMS (short message service) messages, or messages sent using any other suitable messaging technique. The user can send a request to the web server 212 to upload information, for example, images or videos that are embedded in a question object 108 in the question store 208. Additionally, the web server 212 may provide API functionality to send data directly to native client device operating systems, such as iOS, DROID, webOS, and RIM.

The web server 212 may also serve web pages including question objects 108 via the network 204 to external websites 214. These external websites 214 may embed question interfaces in inline frames (iFrame) to request users of the social networking system 100 to answer questions while on external websites 214. The web server 212 may also render question interfaces in third-party applications on client devices 202. In one embodiment, a web server 212 may render question interfaces on a native platform's operating system, such as iOS or ANDRIOD, to appear as embedded advertisements in native applications.

A user profile store 206 maintains profile information about users of the social networking system 100, such as age, gender, interests, geographic location, email addresses, credit card information, and other personalized information. The user profile store 206 also maintains information about objects in the question store 208, answer store 210, and tag store 216 that the users performed actions on. The user profile store 206 also maintains the connections of the users of the social networking system 100. In this way, a module may access the user profile object 122 of a user and identify the user profile objects 122 that user's connections on the social networking system 100.

A question store 208 maintains question objects 108 that have been created by questioning users 116 interacting with the question interface module 102. Question objects 108 are associated with tag objects 106 and answer objects 110 as users interact with the question interface module 102 and answer interface module 114. Actions that are performed on question objects 108, including sharing a question object 108 with other users on the social networking system 100, tagging a user in a question object 108, and creating related questions to the question viewed, are recorded by the social networking system 100 in the user's user profile object 122 and by the question object 108 being acted upon. In one embodiment, the question interface module 102 implements type-ahead Javascript functionality to search the question store 208 for previously submitted questions from other users of the social networking system 100 as a questioning user 116 types in a question via the question interface module 102.

A tag store 216 maintains tag objects 106 that have been created to describe questions asked by users of the social networking system 100. A question parsing module 104 includes a process that parses text in a question and recognizes tag objects 106 that are stored in the tag store 216. These tag objects 106 are identified and associated with the question object 108 for the parsed question. Further, the identified tag objects 106 are also associated with the user profile object 122 for the user asking the question by the tag affinity module 124. A question targeting module 112 monitors unanswered question objects 108 and provides questions to users of a social networking system 100 based on the tag objects 106 associated with the question objects 108.

The tag affinity module 124 includes a process that monitors the usage of tag objects 106 accessed in the tag store 216. When a user answers a question, the tag objects 106 associated with that question may be associated with the user profile object 122 of the user answering the question by the tag affinity module 124. Similarly, if a user interacts with a question, such as sharing the question with other users of the social networking system 100, voting answers up or down, or adding tags to the question, the tags associated with the question are also associated with the user profile object 122 of the user performing the interactions. A user's activities elsewhere in the social networking system, such as sharing links, commenting on a topic, or becoming a fan of a page, may also be used to predict tag affinities.

An answer store 210 maintains answer objects 110 that have been created by an answer interface module 114 in response to a question object 108. Answer objects 110 may be voted up or down by users through the answer interface module 114. Answer objects 110 also record the identifiers of users that have interacted with the answer objects 110 so that their user profile objects 122 may be accessed. For example, an answer object 110 that has been voted up by a connection of the browsing user 118 or targeted user 120 would be displayed higher than other answer objects 110 by the answer interface module 114, in one embodiment. The answer interface module 114, in this example, would access the connections of the browsing user 118 or targeted user 120 by accessing the user profile object 122 and reorder the answer objects 110 accordingly.

Targeting Questions for Users to Answer

Figure 3:
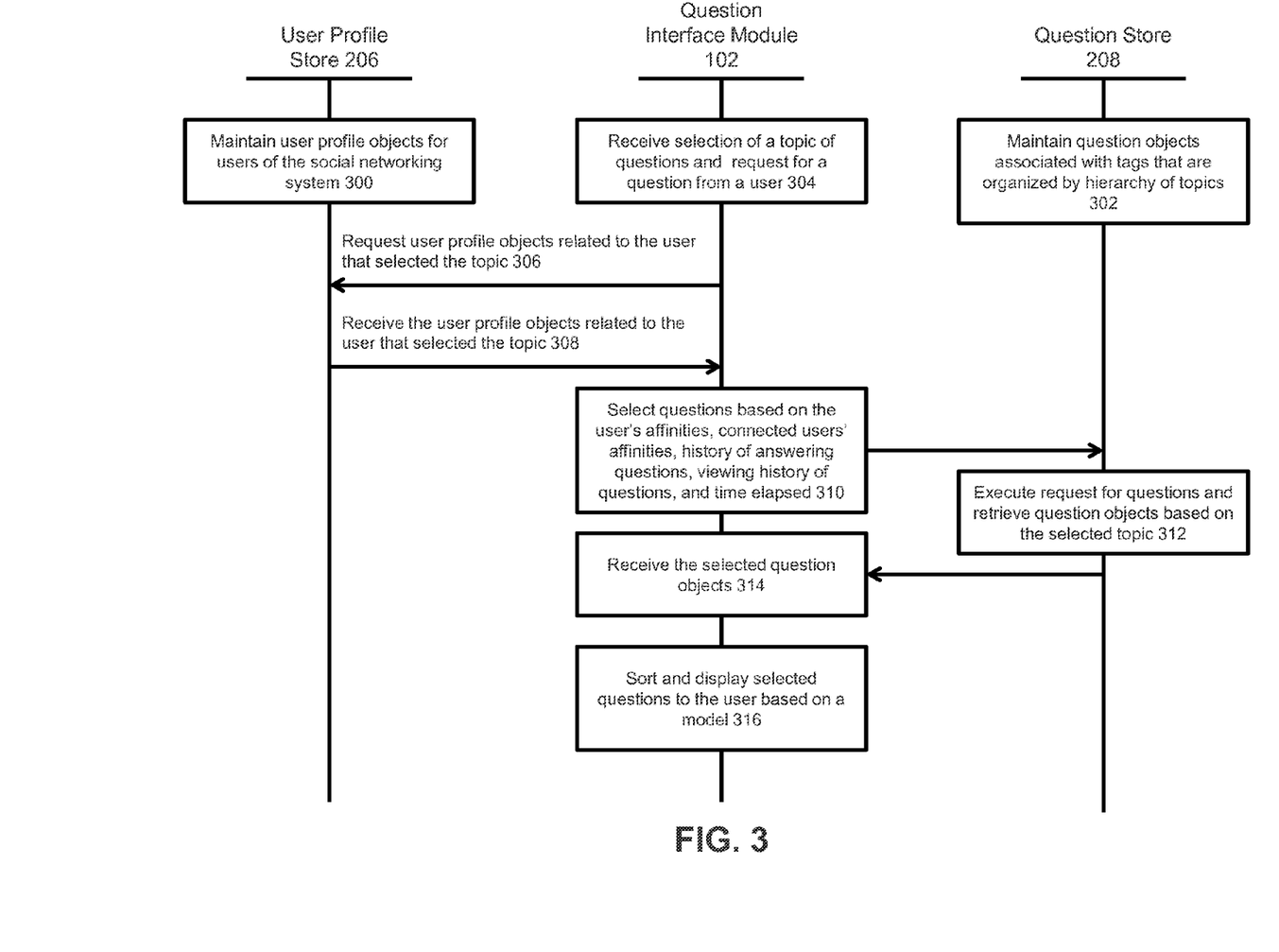
FIG. 3 is an interaction diagram of a process for providing relevant questions to users of a social networking system, in accordance with an embodiment of the invention.

FIG. 3 illustrates a process showing how question objects are targeted to users browsing questions on a social networking system, in accordance with an embodiment of the invention. The user profile store 206 maintains 300 user profile objects for users of a social networking system. The question store 208 maintains 302 question objects that are associated with hierarchically organized tags. Tag objects are hierarchically organized by topic and sub-topic. Relationships are recognized between topics and sub-topics when tags are created. Tags may be created by users and/or by administrators of the social networking system 100. In another embodiment, probabilistic tag relationships may be generated automatically based on analysis of a web corpus (e.g., Wikipedia) using, for example, co-occurrence of terms in articles or web pages. For example, the tag "burrito" can be defined as a sub-topic of the tags "food," "Mexican food," "restaurant," and "cheap eats."

The question interface module 102 receives 304 a selection of a topic and a request to browse a question from a user of the social networking system. Here, a browsing user 118 has interacted with a question interface module 102 and selected a link that corresponds to a topic, such as "food," or a sub-topic, such as "burrito." The question interface module 102 requests 306 user profile objects related to the user that selected the topic. The requested user profile objects include the user profile objects of the browsing user 118 and her connections.

After these user profile objects are received 308 by the question interface module 102, questions are selected 310 from the question store 208 based on the user's affinities for tags, connected users' affinities for tags, the user's history of answering questions, and viewing history of question under the selected topic. For example, if the selected topic is "food," then all questions falling under that topic as well as sub-topics for which the user or the user's connections have an affinity are selected from the question store 208. Because tags are organized hierarchically, the questions that are selected include the selected topic as well as sub-topics that are related to the selected topic. The question store 208 executes 312 the request for questions and retrieves question objects based on the selected topic. The question interface module 102 receives 314 the selected question objects.

As mentioned above, a user's affinities for certain topics are recorded in the user's user profile object. Because tags are organized hierarchically, the user's affinities for tags can be prioritized based on the hierarchy of topics. In one embodiment, the determination is made by only looking at the user's affinities for tags. In another embodiment, a scoring system can be devised to optimize the determination based on a combination of the user's affinities for tags, the user's connections' affinities for tags, history of answering questions under specific tags, viewing history of tags, and time elapsed since last viewing a question under specific tags.

The selected questions are then sorted 316 and displayed based on a model that takes into account the factors mentioned above. In one embodiment, an optimal balance can be achieved through machine learning techniques, including regression analysis. In another embodiment, a weighted model is used with each factor receiving a predetermined weight based on testing of which factors are more influential in keeping a user engaged with the question and answer service. For example, a user's affinity for a tag, such as food, might weigh heavily in the determination of which question to show the user.

On the other hand, if many strong connections have a strong affinity for a sub-topic, such as "cupcakes," and the user has had no interaction with questions that are tagged as being about "cupcakes," the weighted model may indicate that a question about "cupcakes" should be displayed to the user. Similarly, the user's history of answering questions associated with related tags, viewing history of questions, and the time elapsed since selecting the topic and interacting with a question are all factors that can be considered using this model to sort 316 the selected questions.

Tagging New Questions

Figure 4:
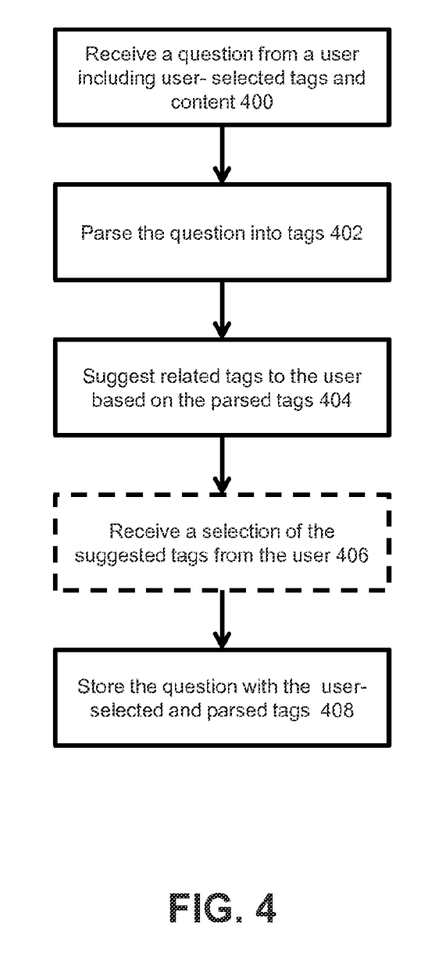
FIG. 4 is a flowchart of a process of tagging and storing a user-generated question in a social networking system, in accordance with an embodiment of the invention.

FIG. 4 illustrates a process in which a question generated by a user is tagged and stored in the social networking system, in accordance with an embodiment of the invention. The social networking system 100 receives 400 a question from a user including user-selected tags and content. In one embodiment, the social networking system 100 receives 400 a question from a user through a client device connected by a network to the social networking system. The user may have selected tags to describe the question, such as "food" and "restaurants."

The social networking system 100 parses 402 the question into tags. A question contains several keywords, or words and phrases that express a certain topic or idea. For example, the question "Where can I find the best tapas in downtown San Francisco?" includes several keywords, including "tapas" and "downtown San Francisco." Along with keywords, content may also be included, such as audio, video, or image files. The question is parsed into tags based on the keywords in the question. In one embodiment, the audio, video, and image content may also be parsed to recognize tags. For example, a user may upload an audio file from a client device with a song that is playing on the radio and may ask "What is this song?" Using sophisticated music matching software, a social networking service may be able to recognize the song or the genre. Similarly, video and image recognition software may be used to tag a question.

The social networking system suggests 404 related tags to the user based on the parsed tags. Because tag objects are stored in the tag store in a hierarchical organization, related tags may include sub-topics and more general topics that are related to the parsed tags. A user may optionally select one of the suggested tags. Thus, the social networking system would receive 406 a selection of the suggested tags by the user. Finally, the question is then stored 408 as a question object that is associated with the tag objects corresponding to the user-selected and parsed tags.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    retrieving profile information related to a user of the social networking system, the profile information including the user's affinity and the user's connections' affinities for each of a plurality of tags, each tag associated with a question topic;
    selecting a set of questions stored in the social networking system based on question topics associated with the plurality of tags and the user's connections' affinities for each of the plurality of tags;
    for each question in the set of questions:
        determining a score for the question based on the user's affinities for a subset of the plurality of tags associated with the question;
        adjusting the score for the question based on one or more activities performed by the user in relation to another question associated with the subset of the plurality of tags;
    sorting the questions based on the adjusted scores for the questions; and
    providing one or more of the sorted questions in a question interface for display to the user.

2. The method of claim 1, wherein selecting questions based on tags related to the selected topic further comprises:
    selecting questions based on tags hierarchically under the tag corresponding to the selected topic.

3. The method of claim 1, wherein selecting questions based on tags related to the selected topic further comprises:
    selecting questions based on tags corresponding to the user's tag affinities.

4. The method of claim 1, wherein the profile information further includes a history of the user's interactions with questions on the social networking system and wherein selecting questions based on tags related to the selected topic further comprises:
    determining a frequency of interaction for each of at least one past tag associated with the history of the user's interactions with questions on the social networking system; and
    selecting questions based on the past tags with a frequency of interaction that meets a predetermined threshold.

5. The method of claim 1, wherein sorting the questions further comprises:
    ordering the questions by the scores from highest score to lowest score.

6. The method of claim 1, wherein for each of the questions, determining a score further comprises:
    for each of the questions, determining a score for the question by combining the user's tag affinities for the tags associated with the question and the user's connections' tag affinities for the tags associated with the question.

7. The method of claim 1, wherein the profile information further includes a time lapse measurement for the duration of time elapsed since the user last interacted with a question related to the selected topic and wherein adjusting the score further comprises:
- comparing the time lapse measurement to an average time lapse measurement for the selected topic;
- determining an adjustment for the selected topic based on the comparison;
- applying the adjustment to the scores for the questions associated with the selected topic; and
- ordering the questions by the corresponding scores from highest score to lowest score.

8. A non-transitory computer readable storage medium storing instructions that, when executed by a processor, cause the processor to:
- retrieve profile information related to a user of the social networking system, the profile information including the user's affinity and the user's connections' affinities for each of a plurality of tags, each tag associated with a question topic;
- select a set of questions stored in the social networking system based on question topics associated with the plurality of tags and the user's connections' affinities for each of the plurality of tags;
- for each question in the set of questions:
  - determine a score for the question based on the user's affinities for a subset of the plurality of tags associated with the question;
  - adjust the score for the question based on one or more activities performed by the user in relation to another question associated with the subset of the plurality of tags;
- sort the questions based on the adjusted scores for the questions; and
- provide one or more of the sorted questions in a question interface for display to the user.

9. The computer readable storage medium of claim 8, wherein selecting questions based on tags related to the selected topic further comprises:
- selecting questions based on tags hierarchically under the tag corresponding to the selected topic.

10. The computer readable storage medium of claim 8, wherein selecting questions based on tags related to the selected topic further comprises:
- selecting questions based on tags corresponding to the user's tag affinities.

11. The computer readable storage medium of claim 8, wherein the profile information further includes a history of the user's interactions with questions on the social networking system and wherein selecting questions based on tags related to the selected topic further comprises:
- determining a frequency of interaction for each of at least one past tag associated with the history of the user's interactions with questions on the social networking system; and
- selecting questions based on the past tags with a frequency of interaction that meets a predetermined threshold.

12. The computer readable storage medium of claim 8, wherein sorting the questions further comprises:
- ordering the questions by the scores from highest score to lowest score.

13. The computer readable storage medium of claim 8, wherein for each of the questions, determining a score further comprises:
- for each of the questions, determining a score for the question by combining the user's tag affinities for the tags associated with the question and the user's connections' tag affinities for the tags associated with the question.

14. The computer readable storage medium of claim 8, wherein the profile information further includes a time lapse measurement for the duration of time elapsed since the user last interacted with a question related to the selected topic and wherein adjusting the score further comprises:
- comparing the time lapse measurement to an average time lapse measurement for the selected topic;
- determining an adjustment for the selected topic based on the comparison;
- applying the adjustment to the scores for the questions associated with the selected topic; and
- ordering the questions by the corresponding scores from highest score to lowest score.

* * * * *